(12) United States Patent
Johnson

(10) Patent No.: US 7,590,829 B2
(45) Date of Patent: Sep. 15, 2009

(54) EXTENSION ADAPTER

(75) Inventor: Scott D. Johnson, Mountain View, CA (US)

(73) Assignee: Stretch, Inc., Sunnyvale, CA (US)

( * ) Notice: Subject to any disclaimer, the term of this patent is extended or adjusted under 35 U.S.C. 154(b) by 77 days.

(21) Appl. No.: 10/404,706

(22) Filed: Mar. 31, 2003

(65) Prior Publication Data

US 2004/0193852 A1    Sep. 30, 2004

(51) Int. Cl.
G06F 9/00    (2006.01)
(52) U.S. Cl. .................... 712/226; 712/227; 712/209
(58) Field of Classification Search .................. 712/226
See application file for complete search history.

(56) References Cited

U.S. PATENT DOCUMENTS

| | | | |
|---|---|---|---|
| 4,635,261 A | 1/1987 | Anderson et al. | |
| 4,766,569 A | 8/1988 | Turner et al. | |
| 4,783,738 A | 11/1988 | Li et al. | |
| 4,893,311 A | 1/1990 | Hunter et al. | |
| 5,055,997 A | 10/1991 | Sluijter et al. | |
| 5,247,689 A | 9/1993 | Ewert | |
| 5,258,668 A | 11/1993 | Cliff et al. | |
| 5,260,610 A | 11/1993 | Pedersen et al. | |
| 5,260,611 A | 11/1993 | Cliff et al. | |
| 5,274,581 A | 12/1993 | Cliff et al. | |
| 5,274,782 A | 12/1993 | Chalasani et al. | |
| 5,293,489 A | 3/1994 | Furui et al. | |
| 5,299,317 A | 3/1994 | Chen et al. | |
| 5,343,406 A | 8/1994 | Freeman et al. | |
| 5,357,152 A | 10/1994 | Jennings, III | |
| 5,361,373 A * | 11/1994 | Gilson ........................... 712/1 |
| 5,414,377 A | 5/1995 | Freidin | |
| 5,426,378 A | 6/1995 | Ong | |
| 5,436,574 A | 7/1995 | Veenstra | |
| 5,471,628 A | 11/1995 | Phillips et al. | |
| 5,488,612 A | 1/1996 | Heybruck | |
| 5,517,627 A | 5/1996 | Petersen | |
| 5,535,406 A | 7/1996 | Kolchinsky | |
| 5,619,665 A | 4/1997 | Emma | |
| 5,636,224 A | 6/1997 | Voith et al. | |
| 5,652,875 A | 7/1997 | Taylor | |
| 5,682,493 A | 10/1997 | Yung et al. | |
| 5,684,980 A | 11/1997 | Casselman | |

(Continued)

FOREIGN PATENT DOCUMENTS

EP    0 507 507    7/1992

(Continued)

OTHER PUBLICATIONS

"Transit Note #118 Notes on Coupling Processors with Reconfigurable Logic"; Andre DeHon; Mar. 1995.*

(Continued)

*Primary Examiner*—Alford W Kindred
*Assistant Examiner*—Benjamin P Geib
(74) *Attorney, Agent, or Firm*—Carr & Ferrell LLP

(57) ABSTRACT

A processor system. The processor system comprises a processor having a first set of instructions associated therewith. The processor system also comprises a programmable logic device and an extension adapter coupled to the processor and the programmable logic device. The extension adapter allows the programmable logic device to implement a second set of reconfigurable instructions for the processor.

49 Claims, 12 Drawing Sheets

U.S. PATENT DOCUMENTS

| | | |
|---|---|---|
| 5,696,956 A | 12/1997 | Razdan et al. |
| 5,726,584 A | 3/1998 | Freidin |
| 5,742,180 A | 4/1998 | DeHon et al. |
| 5,784,636 A | 7/1998 | Rupp |
| 5,794,062 A | 8/1998 | Baxter |
| 5,819,064 A | 10/1998 | Razdan et al. |
| 5,822,588 A | 10/1998 | Sterling et al. |
| 5,828,835 A | 10/1998 | Isfeld et al. |
| 5,847,578 A | 12/1998 | Noakes et al. |
| 5,850,564 A | 12/1998 | Ting et al. |
| 5,920,202 A | 7/1999 | Young et al. |
| 5,926,036 A | 7/1999 | Cliff et al. |
| 5,943,150 A | 8/1999 | Deri et al. |
| 5,956,518 A | 9/1999 | DeHon et al. |
| 5,963,050 A | 10/1999 | Young et al. |
| 5,977,793 A | 11/1999 | Reddy et al. |
| 5,982,195 A | 11/1999 | Cliff et al. |
| 5,986,465 A | 11/1999 | Mendel |
| 5,999,734 A | 12/1999 | Willis et al. |
| 6,026,478 A | 2/2000 | Dowling |
| 6,092,174 A | 7/2000 | Roussakov |
| 6,167,502 A | 12/2000 | Pechanek et al. |
| 6,219,628 B1 | 4/2001 | Kodosky et al. |
| 6,237,079 B1 * | 5/2001 | Stoney .................. 712/34 |
| 6,292,388 B1 | 9/2001 | Camarota |
| 6,343,337 B1 | 1/2002 | Dubey et al. |
| 6,353,841 B1 | 3/2002 | Marshall et al. |
| 6,374,403 B1 | 4/2002 | Darte et al. |
| 6,415,424 B1 | 7/2002 | Arimilli et al. |
| 6,418,045 B2 | 7/2002 | Camarota |
| 6,426,648 B1 | 7/2002 | Rupp |
| 6,467,009 B1 | 10/2002 | Winegarden et al. |
| 6,505,241 B2 | 1/2003 | Pitts |
| 6,557,092 B1 | 4/2003 | Callen |
| 6,622,233 B1 | 9/2003 | Gilson |
| 6,633,181 B1 | 10/2003 | Rupp |
| 6,698,015 B1 | 2/2004 | Moberg et al. |
| 6,721,884 B1 | 4/2004 | De Oliveira Kastrup Pereira et al. |
| 6,732,354 B2 | 5/2004 | Ebeling et al. |
| 6,744,274 B1 | 6/2004 | Arnold et al. |
| 6,795,900 B1 | 9/2004 | Miller et al. |
| 6,799,236 B1 | 9/2004 | Dice et al. |
| 6,817,013 B2 | 11/2004 | Tabata et al. |
| 6,831,690 B1 | 12/2004 | John et al. |
| 6,857,110 B1 | 2/2005 | Rupp et al. |
| 6,874,110 B1 | 3/2005 | Camarota |
| 6,883,084 B1 | 4/2005 | Donohoe |
| 6,954,845 B2 | 10/2005 | Arnold et al. |
| 6,968,544 B1 | 11/2005 | Schneider |
| 6,986,127 B1 | 1/2006 | Newlin et al. |
| 6,996,709 B2 | 2/2006 | Arnold et al. |
| 7,000,211 B2 | 2/2006 | Arnold |
| 7,062,520 B2 | 6/2006 | Rupp |
| 7,086,047 B1 | 8/2006 | Edwards et al. |
| 7,178,062 B1 | 2/2007 | Dice |
| 7,254,142 B2 | 8/2007 | Hagsand et al. |
| 2001/0049816 A1 | 12/2001 | Rupp |
| 2003/0046513 A1 | 3/2003 | Furuta et al. |
| 2003/0097546 A1 | 5/2003 | Taylor |
| 2003/0108119 A1 | 6/2003 | Mohebbi et al. |
| 2003/0120889 A1 | 6/2003 | Roussel et al. |
| 2003/0196058 A1 | 10/2003 | Ramagopal et al. |
| 2004/0019765 A1 | 1/2004 | Klein, Jr. |
| 2004/0186872 A1 | 9/2004 | Rupp |
| 2004/0193852 A1 | 9/2004 | Johnson |
| 2004/0208602 A1 | 10/2004 | Plante |
| 2005/0027970 A1 | 2/2005 | Arnold et al. |
| 2005/0027971 A1 | 2/2005 | Williams et al. |
| 2005/0166038 A1 * | 7/2005 | Wang et al. .................. 712/226 |
| 2005/0268271 A1 | 12/2005 | Gutberlet et al. |

FOREIGN PATENT DOCUMENTS

| | | |
|---|---|---|
| EP | 0 668 659 | 8/1995 |
| EP | 1 443 417 | 8/2004 |
| TW | 478252 | 3/2002 |
| TW | 480818 | 3/2002 |
| TW | 152355 | 7/2002 |
| TW | 152994 | 7/2002 |
| TW | 509798 | 11/2002 |
| TW | 168210 | 4/2003 |

OTHER PUBLICATIONS

Carrillo et al.; "The Effect of Reconfigurable Units in Superscalar Processors"; 2001; ACM.*

Jacob et al.; "Memory Intefacing and Instruction Specification for Reconfigurable Processors"; 1999; ACM.*

Bechade, R.A. et al., "Programmable Arithmetic/Logic Circuits," IBM Technical Disclosure Bulletin, U.S. IBM Corp., New York, vol. 3, No. 11, Apr. 1981, pp. 4870-4873, XP-000713711.

Beeck et al., "CRISP: A Template for Reconfigurable Instruction Set Processors," FPL 2001, LNCS 2147, pp. 296-305, Springer-Verlag Berlin Heidelberg, 2001.

U.S. Appl. No. 10/630,542, filed Jul. 29, 2003, Kenneth Williams, Defining Instruction Extensions in a Standard Programming Language.

U.S. Appl. No. 10/686,882, filed Oct. 15, 2003, Kenneth Williams, Instruction Set for Efficient Bit Stream and Byte Stream I/O.

U.S. Appl. No. 10/750,714, filed Dec. 31, 2003, Ricardo Gonzalez, Systems and Methods for Software Extensible Multi-Processing.

U.S. Appl. No. 10/815,453, filed Mar. 31, 2004, Ricardo Gonzalez, Configuring a Multi-Processor System.

U.S. Appl. No. 11/021,247, filed Dec. 21, 2004, Ricardo Gonzalez, Systems and Methods for Selecting Input/Output Configuration in an Integrated Circuit.

U.S. Appl. No. 11/129,146, filed May 12, 2005, Ricardo Gonzalez, Long Instruction Word Processing with Instruction Extensions.

U.S. Appl. No. 11/099,280, filed Apr. 4, 2005, Jeffrey M. Arnold, Video Processing System with Reconfigurable Instructions.

U.S. Appl. No. 11/204,555, filed Aug. 15, 2005, Jeffrey M. Arnold, Programmable Logic Configuration for Instruction Extensions.

MIPS Technologies, Inc., "MIPS Extension for Digital Media with 3D," 1996, pp. 1-26.

Borgatti, Michele et al., "A Reconfigurable System featuring Dynamically Extensible Embedded Microprocessor, FPGA and Customisable I/O," 2002, IEEE Custom Integrated Circuits Conference, pp. 1-4.

Razdan, Rahul and Michael D. Smith, "A High-Performance Michroarchitecture with Hardware-Programmable Functional Units," Nov. 1994, Proc. of Micro-27, pp. 1-9.

Tanenbaum, Andrew S., "Modern Operating Systems," 2001, 2nd edition, Prentice Hall, New Jersey, p. 31.

Hennessy, John L. and David A. Patterson, "Computer Organization and Design: The Hardware/Software Interface," 1998, 2nd edition, Morgan Kaufmann Publishers, Inc., San Francisco, CA, p. 345.

Lee, K.C., "A Virtual Bus Architecture for Dynamic Parallel Processing," Feb. 1993, IEEE Transactions on Parallel and Undistributed Systems, vol. 4, No. 2, pp. 121-130.

Goldblatt, Kim, "The Low-Cost, Efficient Serial Configuration of Spartan FPGAs," Nov. 13, 1998, XAPP098 (Version 1.0), XILINX.

Scott, Steven L. and Gregory M. Thorson, "The Cray T3E Network: Adaptive Routing in a High Performance 3D Torus," Aug. 15-16, 1996, HOT Interconnects IV, Stanford University.

Golestani, S. Jamaloddin, "A Sto-and-Go Queuing Framework for Congestion Management," 1990 Proc. of the ACM Symposium on Communications Architectures & Protocols, ACM Press, New York, NY, pp. 8-18.

Dally, William J. and Charles L. Seitz, "Deadlock Free Message Routing in Multiprocessor Interconnection Networks," May 10, 1985, Computer Science Department, California Institute of Technology.

Garlan, David and Mary Shaw, "An Introduction to Software Architecture," Jan. 1994, CMU-CS-94-166, School of Computer Science, Carnegie Mellon University, Pittsburgh, PA.

Intel and Hewlett-Packard, "IA-64 Application Instruction Set Architecture Guide," Revision 1.0, 1999, pp. C-1 through C.

Hwang, Kai, "Advanced Computer Architecture: Parallelism, Scalability, Programmability," 1993, McGraw Hill, pp. 182-183.

Ye, Z.A. et al., "Chimaera: a high-performance architecture with a tightly-coupled reconfigurable functional unit," Jun. 10-14, 2000, Proc. of the 27th International Symposium on Computer Architecture, pp. 225-235.

Borkar et al., "iWarp: An Integrated Solution to High-Speed Parallel Computing," 1988, IEEE CH2617-9/88/0000/03300.

Barat, Francisco and Rudy Lauwereins, "Reconfigurable Instruction Set Processors: A Survey," 2000, IEEE 0-7695-0668-2/00.

Pedro Diniz, et al. "Automatic Synthesis of Data Storage and Control Structures for FPGA-based Computing Engines," 2000 IEEE, pp. 91-100.

Ricardo E. Gonzales, "XTENSA: A Configurable and Extensible Processor," Mar.-Apr. 2000, IEEE Micro, pp. 60-70.

Michael Bedford Taylor et al., "The Raw Microprocessor: A Computational Fabric for Software Circuits and General-Purpose Programs," Mar.-Apr. 2002, IEEE Micro, pp. 25-35.

Elliot Waingold et al., "Baring It All to Software: Raw Machines," Computer, Sep. 1997, 1997 IEEE, pp. 86-93.

U.S. Appl. No. 10/746,018, filed Dec. 23, 2003, Rupp, et al.

Dehon, Andre, "Transit Note #118 Notes on Coupling Processors with Reconfigurable Logic," M.I.T. Transit Project, Last Updated Mar. 21, 1995.

Golestani, S. Jamaloddin, "A Stop-and-Go Queuing Framework for Congestion Management," 1990, Proc. of the ACM Symposium on Communications Architectures & Protocols, ACM Press, New York, NY, pp. 8-18.

Hauck et al., "The Chimaera Reconfigurable Functional Unit", Proceedings of the 5th Annual Symposium on FPGAs for Custom Computing Machines, Apr. 16-18, 1997, IEEE, pp. 87-96.

Lu et al., "The MorphoSys Dynamically Reconfigurable System-On-Chip", Proceedings of the First NASA/DoD Workshop on Evolvable Hardware, IEEE, Jul. 19-22, 1999, pp. 152-160.

XILINX, "Virtex™ 2.5 V Field Programmable Gate Arrays, Product Specification, " DS003-2 (v2.8.1) Dec. 9, 2002, pp. 1-20.

Michael J. Wirthlin et al., "DISC: The dynamic instruction set computer," Proceedings SPIE, Field Programmable Gate Arrays (FPGAs) for Fast Board Development and Reconfigurable Computing, Oct. 25-26, 1995, 14 pages.

* cited by examiner

EXTENSION ADAPTER

RELATED APPLICATION

This patent application is related to U.S. Patent Publication Number US 2001/0049816 to Adaptive Silicon, Inc., entitled "Multi-Scale Programmable Array," which is incorporated herein by reference in its entirety for all purposes.

BACKGROUND OF THE INVENTION

1. Field of the Invention

The present invention relates generally to processors, and more particularly to programmable microprocessor systems.

2. Background of the Invention

Designing processor systems can be a daunting task. Moreover, the suitability of a processor for a given application is not always ideal. Unfortunately, it is a difficult and expensive task to modify an existing processor design. Also, redesigning a processor to have additional features to cover a plurality of applications is a difficult and costly endeavor. Additionally, it is not always possible to know all of the target applications that a processor may be architected for when the processor is designed.

Instead of attempting to modify a processor, many designers choose to execute a pure software solution for certain aspects of various applications. However, using software typically results in a lower performing final solution.

Other designers opt to instill some of the processing special purpose hardware, such as a coprocessor, that they design for the application(s). However, this approach costs valuable time in transferring data to and from the special purpose hardware.

Prior art attempts at extending processor instruction sets pre-silicon (before fabrication) have been made. One example is the Intel MMX processor. Other examples include media processing, graphics processing, digital signal and image processing (DSP), and networks processors. Many different processors must be designed for many different applications, and this is an expensive endeavor.

Thus, an improved system and method for designing processors is desired that exhibits valuable performance gains when targeting a variety of applications.

SUMMARY OF THE INVENTION

The present invention provides, in various embodiments, an extension adapter. In one embodiment, a processor system comprises a processor having a first set of instructions associated therewith. The processor system also comprises a programmable logic device and an extension adapter coupled to the processor and the programmable logic device. The extension adapter allows the programmable logic device to implement a second set of reconfigurable instructions for the processor.

In another embodiment, a method is provided of interfacing a processor with a programmable logic device. The method comprises coupling the processor to the programmable logic device via an extension adapter. The processor has a first set of instructions associated therewith. The method further comprises programming a second set of reconfigurable instructions for the processor. The second set of reconfigurable instructions are contained in the programmable logic device. The method also comprises programming the extension adapter to facilitate an interaction between the processor and the second set of reconfigurable instructions.

A further understanding of the nature and advantages of the inventions herein may be realized by reference to the remaining portions of the specification and the attached drawings.

DESCRIPTION OF THE SPECIFIC EMBODIMENTS

Figure 1:
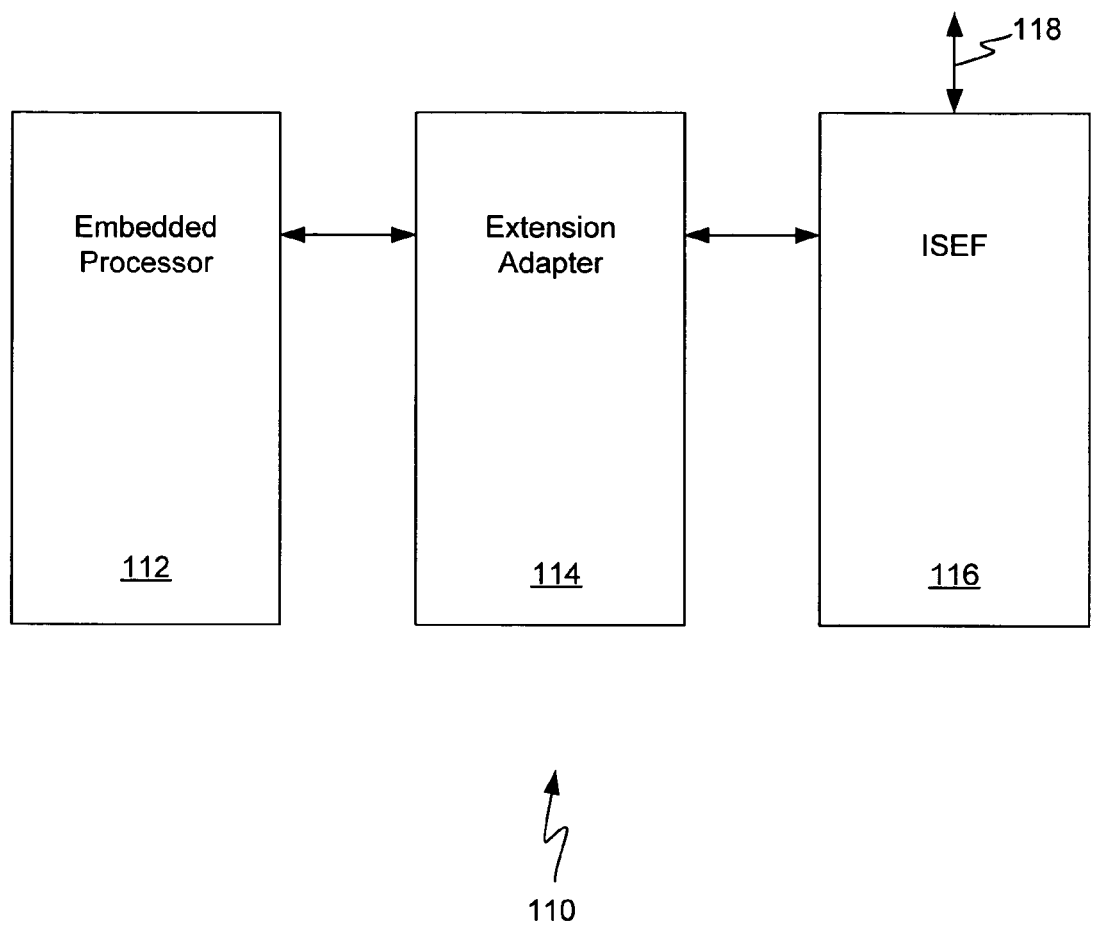
FIG. 1 is a schematic diagram of an exemplary system, in accordance with an embodiment of the present invention.

As shown in the exemplary drawings wherein like reference numerals indicate like or corresponding elements among the figures, embodiments of a system and method according to the present invention will now be described in detail. The following description sets forth an example of an extension adapter and related method.

Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

As previously mentioned, designing processors can be problematic. For example, it may not be feasible to optimize for every potential application when designing a processor. It is desirable to create a processor that can be customized post-silicon to meet specific application needs.

Referring now to the drawings, FIG. 1 is a schematic drawing of an exemplary system 110 in accordance with an embodiment of the present invention. A processor, such as embedded processor 112, is coupled to extension adapter 114. Extension adapter 114, in turn, is coupled to Instruction Set Extension Fabric (ISEF) 116 (a programmable logic device such as from Stretch, Inc., of Los Gatos, Calif.) and described in U.S. Patent Publication Number US 2001/0049816, which has been incorporated by reference. Embedded processor 112 can be any suitable embedded processor such as, for example, the Xtensa® V (T1050) processor, which can be obtained from Tensilica, Inc., of Santa Clara, Calif. Embedded processor 112 provides standard processing capabilities. Embedded processor 112 can include optional features such as additional coprocessors (e.g., a multiplier (16-bit, 32-bit, etc.); a multiply-accumulate (MAC) unit, a floating point unit, a digital signal processing (DSP) engine, etc.), a write buffer, a variety of exception handling features, a variety of debug handling features, read only memory (ROM), etc. In one embodiment ISEF 116 runs at 100 MHz.

ISEF 116 includes programmable logic and provides instruction extension capabilities. This programmable logic array houses user-functionality that can be altered post-silicon. This functionality effectively extends the instruction set of embedded processor 112 by adding new instructions that are tailored to a user's specific needs. The logic in ISEF 116 typically runs at a slower clock speed than embedded processor 112. Typically, the cycle length is a multiple of the embedded processor 112 clock cycle.

One purpose of extension adapter 114 is to interface embedded processor 112 with ISEF 116. Extension adapter 114 can be implemented in ASIC logic. Extension adapter 114 includes logic that bridges the gap between embedded processor 112 and ISEF 116. ISEF 116 has further interface(s) 118 for purposes such as testability. Extension adapter 114 plus ISEF 116 provide logic that allows users to modify the base functionality of the system within which it is being used. The modification is in the form of new instructions that extend the base instruction set defined by embedded processor 112. It is noteworthy that the instruction execution itself is implemented in one or more of ISEF 116, which are programmable logic similar to FPGAs in one embodiment. Extension adapter 114 interfaces one or more ISEFs 116 to embedded processor 112 and controls dataflow.

Embedded processor 112 has a built-in knowledge of what instructions exist and are valid. This would include typical add instructions, subtract instructions, multiply instructions, load instructions, store instructions, other load/store module 210 functionality, etc. These instructions are hard-coded into the silicon and require no software adaptation.

Figure 2:
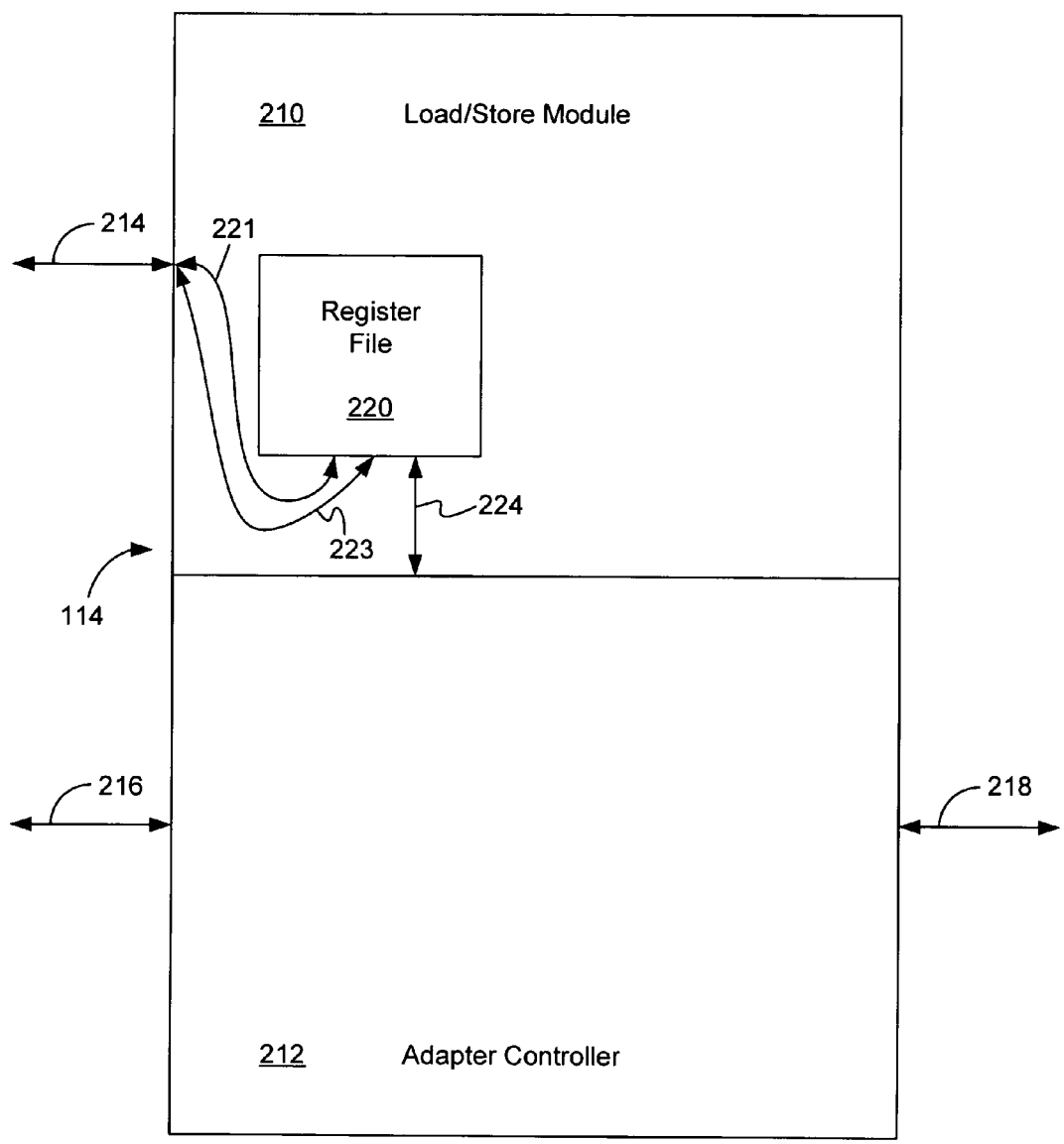
FIG. 2 is a schematic diagram illustrating the extension adapter of FIG. 1 in greater detail, in accordance with an embodiment of the present invention.

Referring to FIG. 2, extension adapter 114 is shown in greater detail. In one embodiment, extension adapter 114 comprises load/store module 210 and adapter controller 212. In another embodiment, embedded processor 112, and not extension adapter 114, comprises load/store module 210.

Load/store module 210 is created via a compiler, such as, for example, the Tensilica Instruction Extension (TIE) compiler, which can be obtained from Tensilica, Inc., of Santa Clara, Calif. TIE is a language that allows a user to describe the functionality of new extended instructions. A designer uses TIE to create a standard set of functions that extend the normal functionality of embedded processor 112. The TIE code that a designer writes describes the functionality of a series of resources that aid in the interface between embedded processor 112 and ISEF 116. Users can therefore add new instructions pre-silicon. Extension adapter 114 functions so that embedded processor 112 treats user-defined post-silicon instructions as if they were legal TIE pre-silicon (for example) instructions.

Load/store module 210 interfaces with embedded processor 112 via interface 214. Register file 220 is coupled to interface 214 via embedded processor control and data interface 221 and via ISEF 116 control and data interface 223. Adapter controller 212 interfaces with embedded processor 112 via interface 216. Adapter controller 212 interfaces with ISEF 116 via interface 218.

In an exemplary embodiment according to the present invention, load/store module 210 comprises register file 220. Register file 220 is a register file, or collections of registers, that is added by using, for example, the TIE compiler. Register file 220 interfaces with adapter controller 212 via interface 224. In one embodiment, register file 220 is 128 bits wide. In another embodiment, register file 220 is 64 bits wide. However, register file 220 can be of varying widths. It is contemplated that the system can comprise one or more than one register file 220. Adapter controller 212 accesses register file 220. Adapter controller 212 is then used to interface with ISEF 116.

Load/store module 210 provides fixed instruction functionality. A set of fixed instructions includes instructions for moving data to and from external memory into and out of register file 220. This collection of functionality is defined in the TIE language, and run through Tensilica's TIE compiler, in one embodiment. It is contemplated that languages other than TIE can be used with the present system. Load/store module 210 contains one or more register files 220 and a set of fixed instructions that give register files 220 access to external memory via load and store instructions. Again, these instructions will be fixed once the silicon is created, and are fully implemented using the standard TIE flow. It is a function of the extension adapter 114 to encapsulate the fixed functionality and manage it with the configurable interface logic.

A purpose of load/store module 210 includes declaring the functionality of register file 220, which is basically temporary storage for data that is going to end up being transferred from embedded processor 112 to ISEF 116. Load/store module 210 defines not only register file 220, but also how to load and store generic instructions (e.g., Tensilica instructions) of embedded processor 112 into register file 220.

Adapter controller 212 performs the function of interfacing with register file 220. Adapter controller 212 also operates on the data from register file 220 and interfaces register file 220 with ISEF 116.

In one exemplary methodology, a user uses standard embedded processor 112 load and store instructions to load data into register file 220. A user then uses ISEF 116 instructions, controlled by extension adapter 114, to bring the data out of register file 220, send the data to ISEF 116 (computations take place here that are managed by extension adapter 114 in terms of control and managed by ISEF 116 in terms of functionality), and then take the data that comes back from ISEF 116 at some time later and send the data into register file 220. Subsequently, store instructions are used to send the data out to memory via interface 214.

What ISEF 116 and adapter controller 212 do to extend ISEF 116 is allow a user to add new instructions that change with software on different implementations of the same silicon. For example, a user can add specialized instructions to perform video or audio encoding/decoding. These instructions are not hard-wired into embedded processor 112. Therefore, a purpose of extension adapter 114 is to bridge the gap between what embedded processor 112 knows at the time of silicon (e.g., adds, subtracts, loads, stores, etc.) and new instructions that a user (e.g., customer, etc.) adds after receiving the silicon and may in fact change over time, while still using the same piece of silicon. These new instructions are managed in adapter controller 212 of extension adapter 114.

It is noteworthy that extension adapter 114 handles the multiplexing of data among register file(s) 220 and ISEF(s) 116. Extension adapter 114 manages the timing relationships between register reads and register writes, which are functions of instruction execution length.

It is also noteworthy that the processor system comprises means for ensuring proper configuration of ISEF 116 before use of ISEF 116. In one example, if the system tries to execute an instruction not included in the instruction set of embedded processor 112 that has yet to be configured in ISEF 116, the means for ensuring, which comprises hardware in one embodiment, generates an exception. It is also envisioned that the means for ensuring can comprise software or a combination of hardware and software.

Figure 3:
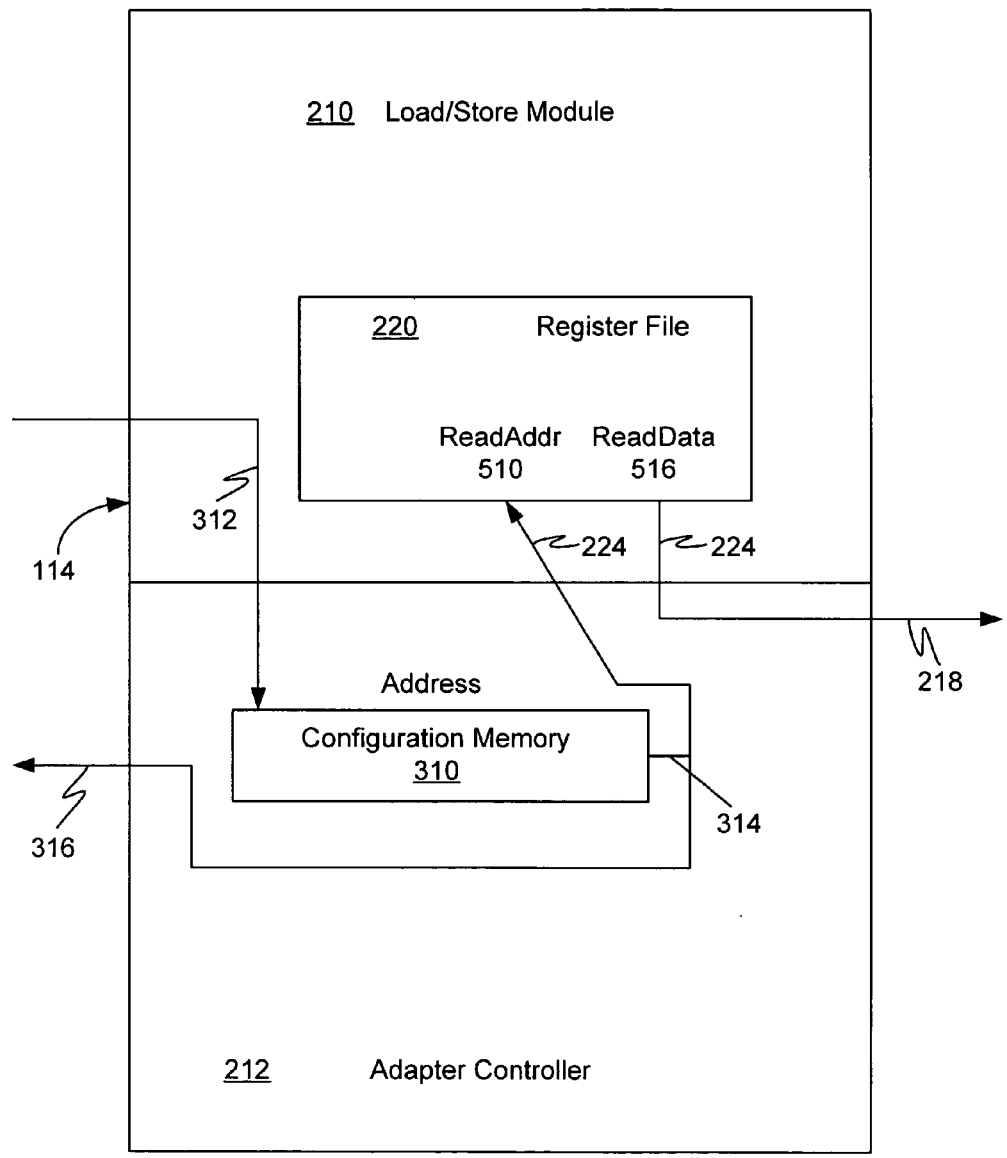
FIG. 3 is a schematic diagram illustrating an operation involving the reading of data, in accordance with an embodiment of the present invention.

In keeping with some embodiments according to the present invention, FIG. 3 illustrates an operation involving the reading of data. Configuration memory 310 has a description of what user instructions are adapted to do with respect to the interface to embedded processor 112. For any instruction that a user creates those instructions should control embedded processor 112 in such a way that embedded processor 112 thinks that those instructions are the same as normal instructions for an add, subtract, multiply, load, store, etc. Configuration memory 310 takes in an instruction description 312 (a portion of interface 214 of FIG. 2). Instruction description 312 comes in the form of a sequence of binary numbers (e.g., a 24-bit sequence) that is decoded by configuration memory 310 and converted into an address lookup into configuration memory 310.

Configuration memory 310 then outputs configuration information about the instruction. If the instruction description describes a normal add, subtract, etc., then configuration memory 310 does not do anything with the instruction because the instruction is part of the normal instruction space of embedded processor 112. However, if the instruction is one of the specialized instructions that ISEF 116 is to perform then configuration memory returns configuration information 314 back to embedded processor 112 to indicate this is a valid instruction and extension adapter 114 in the future will take care of the data manipulation so that to embedded processor 112 it appears that the instruction is identical in form to a standard instruction of embedded processor 112.

Information 314 is a series of information coming out of configuration memory 310, some of which goes to embedded processor 112 via interface 316. Some of information 314 goes into register file 220. Information 314 going into register file 220 as ReadAddr 510 (read address) is carried on interface 224. The information coming out of register file 220 as ReadData 516 (read data) is also carried on interface 224. In this example, configuration information 314 includes the address to the register file for the data that a new instruction needs to receive to be sent out to ISEF 116 via interface 218. So configuration information 314 provides the address and the data goes out to ISEF 116 in the next instruction/cycle. Interface 316 is a collection of outputs leading back to embedded processor 112.

Figure 4:
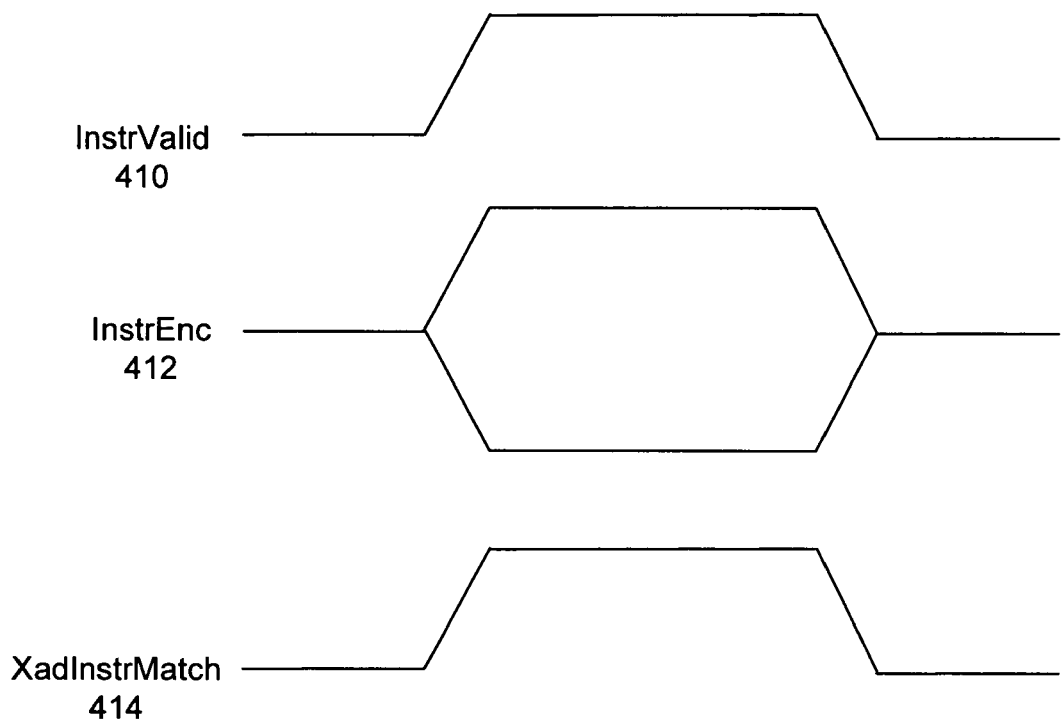
FIG. 4 is a timing diagram, in accordance with an embodiment of the present invention.
Figure 5:
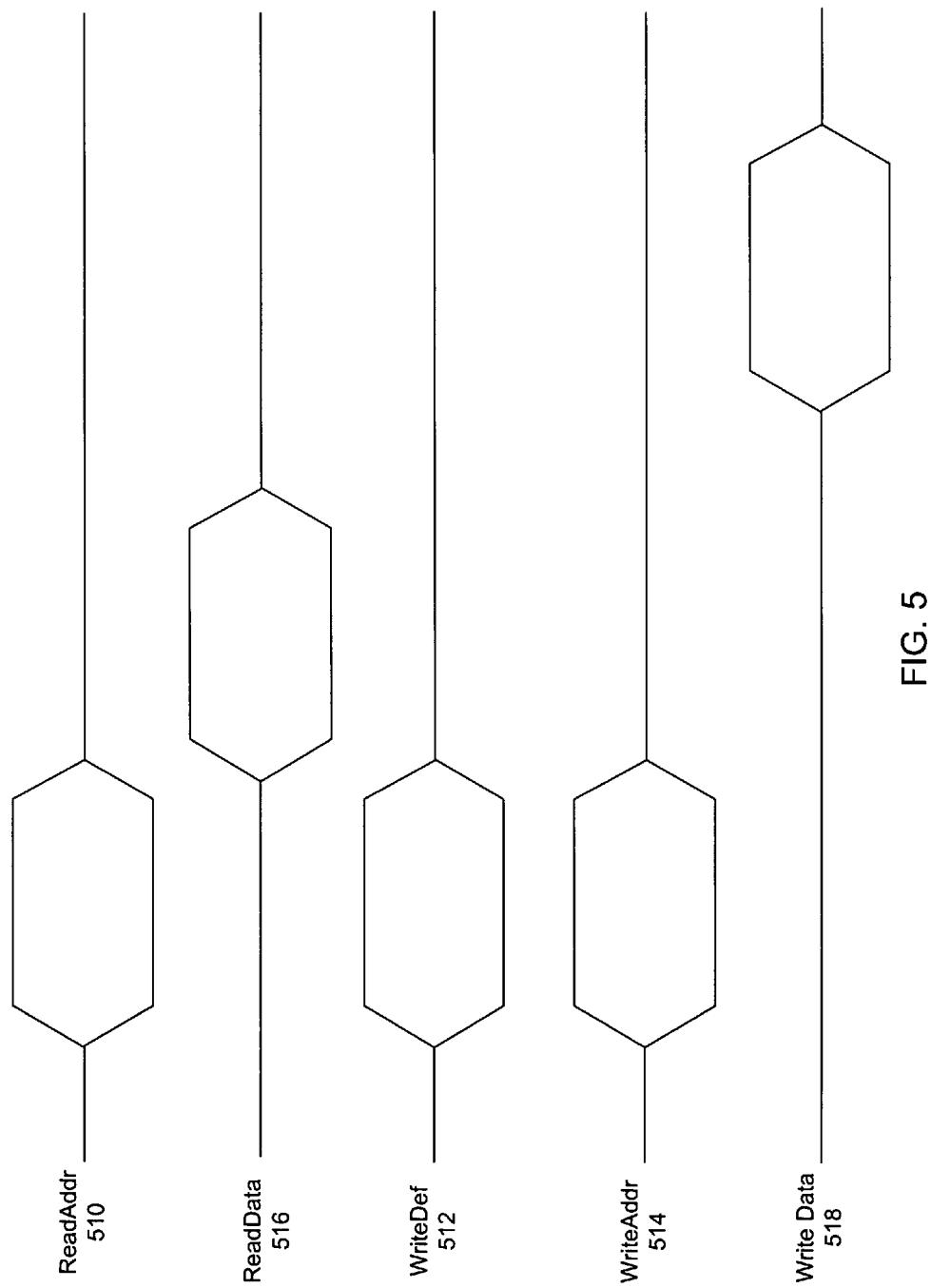
FIG. 5 is a timing diagram, in accordance with an embodiment of the present invention.
Figure 6:
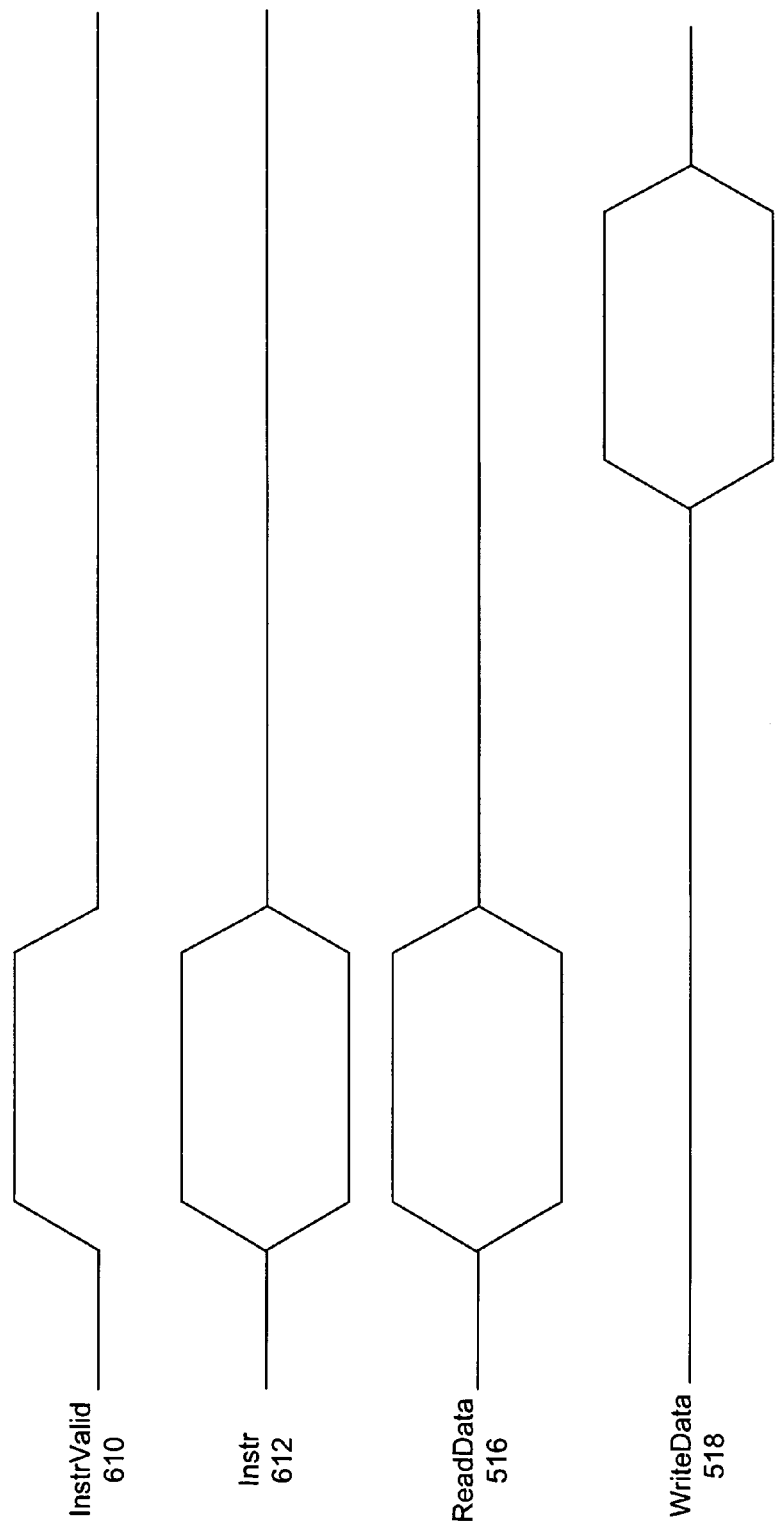
FIG. 6 is a timing diagram, in accordance with an embodiment of the present invention.

In further keeping with some embodiments according to the present invention, FIG. 4 is an exemplary timing diagram related to interface 214, 216 between embedded processor 112 and extension adapter 114. FIG. 5 is an exemplary timing diagram related to interface 218 between extension adapter 114 and ISEF 116. FIG. 6 is an exemplary timing diagram related to interface 224 inside extension adapter 114 between configuration memory 310 and register file 220. FIGS. 4-6 depict exemplary timing diagrams related to an interaction involving an instruction coming out of embedded processor 112 and a response back to embedded processor 112 from extension adapter 114, the interface to get the data out of register file 220, and the interface of that data going to ISEF 116 and back. In order describe the write functionality into register file 220, it is useful to examine an exemplary timing relationship between embedded processor 112, extension adapter 114 and ISEF 116. The read instructions typically happen almost simultaneously.

Exemplary timing related to interface 214, 216 between embedded processor 112 and extension adapter 114 is highlighted by InstrValid (instruction valid) 410 and InstrEnc (instruction encoding) 412. InstrValid 410 indicates whether or not embedded processor 112 is providing a valid instruction. If there is a valid instruction then InstrEnc 412 indicates the instruction number. In one embodiment, there is only one instruction per cycle within embedded processor 112. Other embodiments of embedded processor 112 can issue multiple instructions per cycle.

In one embodiment, the first thing extension adapter 114 does is look in its configuration memory 310 and determine whether or not this instruction is in fact destined for ISEF 116. If the instruction is destined for ISEF 116, then extension adapter 114 drives a response back on a bus to embedded processor 112 in the form of a signal XadInstrMatch 414 (extension adapter instruction match) that indicates this is a valid instruction. The signal XadInstrMatch 414 indicates that the instruction is an instruction that extension adapter 114 is going to handle and that the results will go back to embedded processor 112.

Referring to FIG. 5, roughly at same time, in one embodiment, configuration memory 310 interfaces, via interface 224, with register file 220 in the form of ReadAddr 510. ReadAddr 510 is gathered from the instruction in configuration memory 310. Configuration memory 310 also sends some information to adapter controller 212 (the configurable portion of the extension adapter 114 logic), preparing for a future write. This information comprises WriteDef 512 (write definition time). WriteDef 512 is a cycle number indicating when the write will be defined, as well as the address, WriteAddr 514 (write address), for which write data is to be written into register file 220 when the write data arrives from ISEF 116.

In operation according to one embodiment, ReadData 516 is sent to ISEF 116 and some period of time occurs before WriteData 518 is returned. It is noteworthy that this period of time can be of varying lengths. The system prepares for that write (which will be written at a future time) by setting the define cycle number (WriteDef 512) and the address (WriteAddr 514) and sending WriteAddr 514 to register file 220. Register file 220 then takes ReadAddr 510 and retrieves ReadData 516 from register file 220. After ReadData 516 is sampled it is sent to ISEF 116.

Referring to FIG. 6, a timing diagram related to an interface between extension adapter 114 and ISEF 116 is illustrated. The timing lines labeled InstrValid (instruction valid) 610, Instr (Instruction) 612 and ReadData 516 show the instruction valid only if destined for ISEF 116. The instruction number (InstrEnc 412) is delayed one cycle in this example. Consequently, ISEF 116 is informed that there is a valid instruction, which is identified by the instruction number. ISEF 116 also receives the data that was pulled out of register file 220 and is associated with the instruction and held by extension adapter 114 while InstrValid 610 is high.

Typically, ReadData and ReadAddr each comprise multiple pieces of data. In other words, there are typically multiple read addresses and multiple read data. Instead of there being just one piece of data, there are multiple entries in configuration memory 310 that correspond to particular addresses for register file 220. Data corresponding to particular addresses is sent to ISEF 116. In one embodiment, ReadData and ReadAddr are not restricted to describe simply one transfer. First, a plurality of read buses can be defined connecting the register files to ISEFs 116. Second, each data bus can be subdivided into a plurality of segments, each independently controlled with separate addresses (alternatively, they can be managed as a whole). The read data of the segments is gathered together on a bus and delivered as a unit. Similarly, a plurality of write buses can each be subdivided and controlled as independent segments or as a whole. Write operations in ISEF 116 take a variable amount of time, defined by WriteDef 512. When the data returns from ISEF 116 it is delivered to the register files, managed at a subdivided level or as a whole. Therefore, one purpose of extension adapter 114 is to monitor this interface, monitor the timing and align data such that data gets sent back to the register files (e.g., register file 220) at the appropriate time.

Figure 7A:
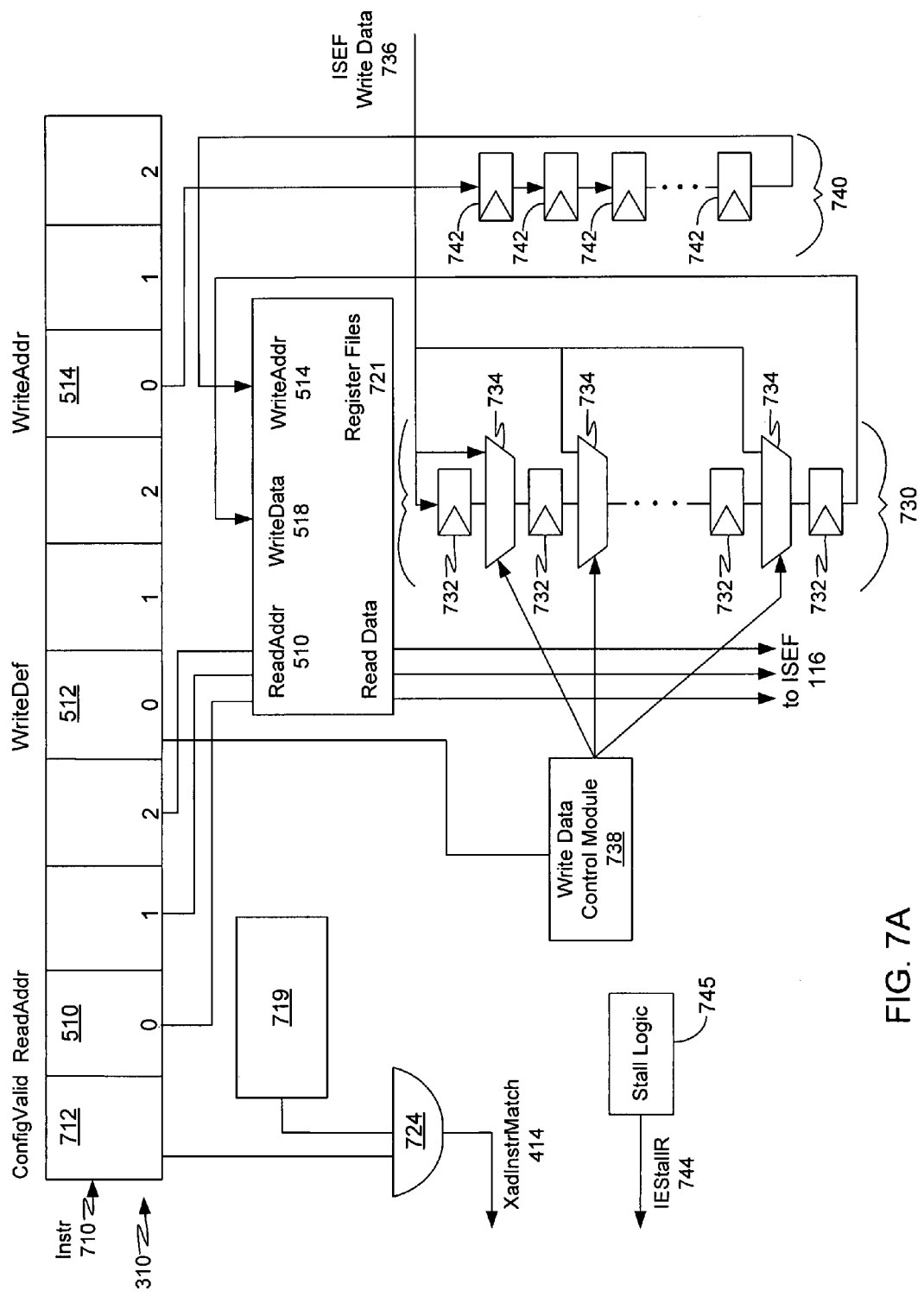
FIG. 7A is a schematic diagram showing a configuration memory controlling a register file, in accordance with an embodiment of the present invention.

Referring to FIG. 7A, configuration memory 310 is shown controlling register files 721. Register files 721 may comprise a plurality of (or just one) register file(s) 220 where each can be managed as a whole or subdivided into independent segments. Register file 220 is where the interface between the clock domains of embedded processor 112 and ISEF 116 occurs. In one embodiment, WriteAddr 514 and WriteData 518 for each clock domain (embedded processor 112 and ISEF 116) go into register file 220. This facilitates embedded processor 112 and ISEF 116 operating together. It is noteworthy that, in one embodiment, the frequency of embedded processor 112 clock is greater than or equal to the frequency of ISEF 116 clock. It is also noteworthy that, in one embodiment, the cycle length of embedded processor 112 clock is a multiple of that of ISEF 116 clock. In one embodiment, ISEF 116 runs at a high clock speed. By "high" it is meant, for example, that ISEF 116 runs at a clock speed that is between two and four times slower than the clock speed at which embedded processor 112 runs. In one embodiment, ISEF 116 runs at a clock speed that is substantially three times slower than the clock speed at which embedded processor 112 runs.

FIG. 7A depicts some of the contents of configuration memory 310 and how they interact, e.g., with the write portion of register file 220. Instruction 710 coming into adapter controller 212 points into configuration memory 310. A series of bits of instruction 710 coming into adapter controller 212 become the address for configuration memory 310. The contents of configuration memory 310 as shown here comprise ConfigValid (Configuration Valid) bit 712 that indicates this is a valid instruction preserved for use in ISEF 116. Else, ConfigValid bit 712 indicates that this is not a valid instruction.

Configuration memory 310 also comprises information to control register file 220. For example, three bits of information are shown in FIG. 7A for ReadAddr 510, WriteDef 512 and WriteAddr 514. These bits contain information that is kept track of for ISEF 116 instructions.

Instruction 710 creates a configuration memory 310 address and a lookup is performed to determine the contents of configuration memory 310. If the Configuration Valid bit, ConfigValid 712, is true, as well as some other fields (bits) 719 of instruction 710 are true, as determined by logic, then we know that instruction 710 is a valid instruction going back to embedded processor 112 via feedback XadInstrMatch 414. It is noteworthy that the instruction extension language used herein may be, for example, the TIE language.

There is a predefined space in opcode for any instruction that could potentially be an ISEF 116 instruction. Every bit has a value of either true, false or "don't care" for the instruction that has to be satisfied. For example, each of 24 bits of an instruction has to be either true, false or "don't care." If bits 719 are true then the opcode space is enabled stating that this instruction is a legal ISEF-type instruction. So the configuration valid bit, ConfigValid 712, comes into AND gate 724 and gets ANDed, via AND gate 724, with bits 719. However, utilization of AND gate 724 is not necessary. A match between the opcode bits and ConfigValid 712 bit should be true for XadInstrMatch 414 to be true.

Bits 719 being true indicate that the output space is enabled for ISEF 116 and ConfigValid 712 being true means configuration memory 310 indicates instruction 710 is a valid instruction. In one embodiment, 64 instructions are allocated in the opcode space for ISEF 116. However, more or fewer instructions are contemplated. Whether or not a particular instruction is true is determined by ConfigValid bit 712 in combination with logic (the decoding of space enable—the opcode space being enabled).

At least one (e.g., three, etc.) ReadAddr (read address) 510 value comes from instruction 710 and is coupled to control register file 220. At least one ReadData (read data) 516 value comes out of register file 220 and is coupled to ISEF 116.

Two important pieces of data that come out of configuration memory 310 for each instruction include WriteDef 716 (at what cycle this particular write is going to be completed) and WriteAddr 514 (where the data is to be written back into register file 220). In this example there are three write ports for register file 220; however, it is contemplated that there can be more or fewer write ports. We have to have some amount of control to remember the cycle in which the data is coming back from ISEF 116 so that the system inserts the data into write data pipeline 730 for register file 220. Write pipeline 730 is shown as a series of registers 732 coupled to one another via a series of pipeline MUXs 734 that control either the value passing down write data pipeline 730 or the value, ISEF write data 736, coming back from ISEF 116.

Write data pipeline 730 is advanced every cycle with the data marching down the pipeline appropriately as the data is only inserted into the pipeline when the data is valid coming back from ISEF 116. Moreover, insertion of that data is managed by write data control module 738 whose output is managing selection of MUXs 734. This pipeline depth is a fixed number of registers 732. The number of registers 732 can vary between different embodiments according to the present invention. The data is inserted in the appropriate place but it is marched down to a fixed number and then written to register file 220. The ability to flexibly control the insertion point of write data into a register file pipeline by software, as contemplated herein, is not known in the prior art. Typically, in the prior art, pipeline depths of coprocessors and functional units are fixed at design time and are not configurable post-silicon. It is envisioned that, in the present system, pipeline depths of coprocessors and functional units are not necessarily fixed at design time and are configurable post-silicon.

In keeping with some embodiments according to the present invention, in coordination with the advancing of write data pipeline 730 is write address pipeline 740. Write address pipeline 740 comprises registers 742. WriteAddr 514 is coming out of configuration memory 310 and is inserted into write address pipeline 740. In this case there are no MUXs because there is no new information that comes along. The address is known at the beginning of the instruction. FIG. 7A only shows one write port for register file 220, but this is repeated for other write ports that may exist.

FIG. 7A additionally shows some stall information IEStallR 744 (instruction extension stall read). IEStallR 744 is information generated by stall logic 745 going back to embedded processor 112 that indicates that extension adapter 114 in conjunction with ISEF 116 is not currently available to take the instruction and the system would only drive that signal high if this instruction were destined for ISEF 116. This is the way that extension adapter 114 is able to tell embedded processor 112 that this is our instruction but we are not ready to accept it yet. Stall logic 745 prevents a hazard from occurring.

Figure 7B:
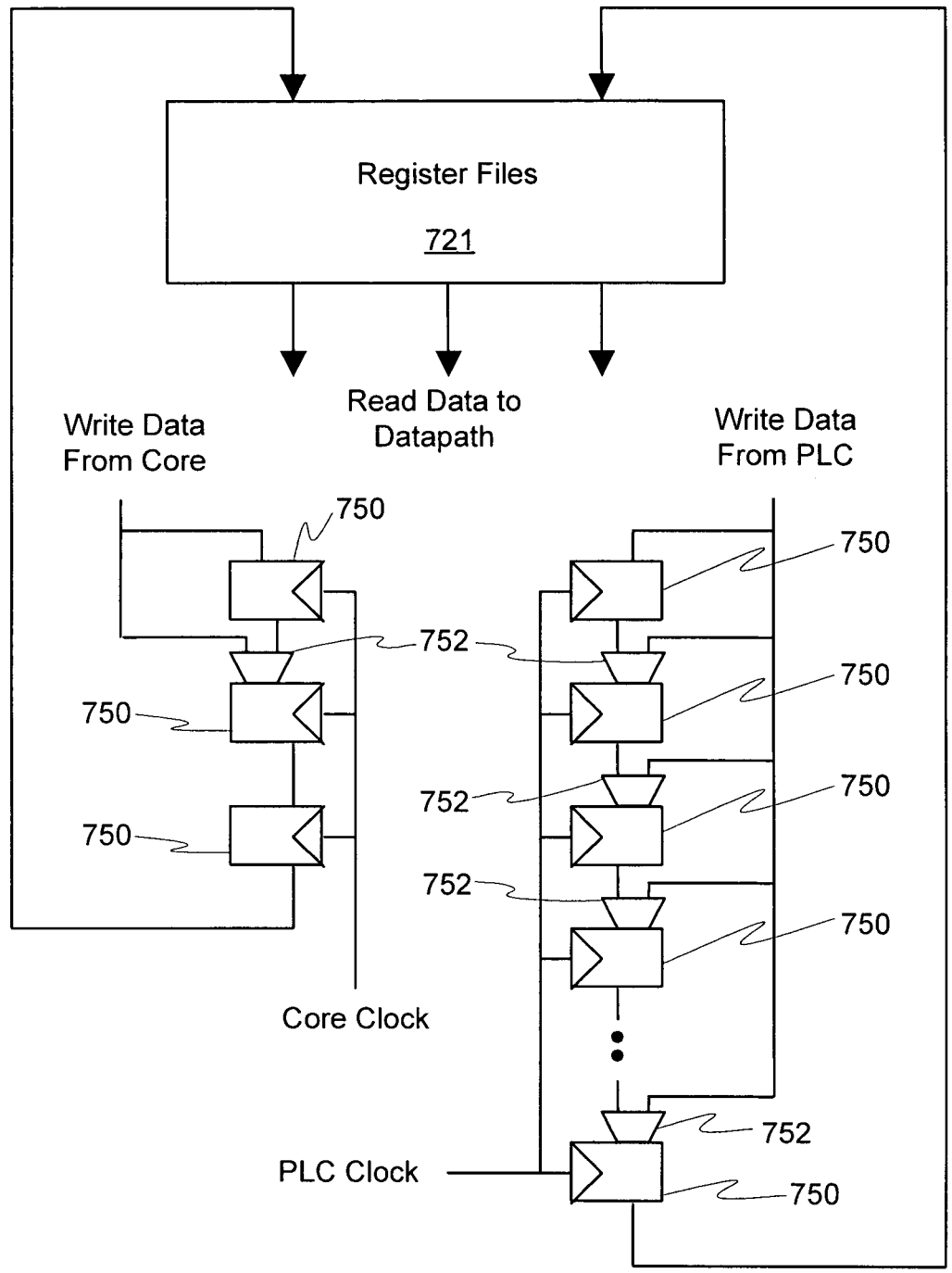
FIG. 7B is a schematic diagram showing another embodiment of a register file illustrating two clock domains, in accordance with an embodiment of the present invention.

FIG. 7B illustrates one write port into split into two write ports (two write ports can be split into three in another example), dedicating one to embedded processor 112 clock writes and one to ISEF 116 clock writes. For the most part, these two pipelines are independent (except for the fact that embedded processor 112 clock write pipeline nullifies transactions on the longer ISEF 116 clock pipeline). This allows the shorter pipeline to operate in embedded processor 112 clock speed, and the longer pipeline to operate in ISEF 116 clock speed.

It is noteworthy that both a two-port (one embedded processor 112 and one ISEF 116) solution and a three-port (one embedded processor 112 and two ISEFs 116) solution will work. Other numbers of ports are contemplated as well.

FIG. 7B shows a top-level view of a split-pipeline (dual parallel pipeline, or simply dual pipeline) register file 721 design, comprising registers 750 and MIUXes 752. The left pipeline is for data that arrives at embedded processor 112 clock speed. (In one implementation, this is data resulting from a move into a register file or a load into a register file). The right pipeline is for data that arrives at the slower clock (ISEF 116 clock) speed, namely data from ISEF 116 computations. While the arrival of data is fixed in the embedded processor 112 clock side (cycle one for moves, cycle two for loads), the arrival of data from ISEF 116 can occur on different cycles. In one embodiment, this is fixed and does not exceed nine ISEF 116 clocks, however that is an implementation decision and need not always be the case.

Arriving data, on either pipeline, enters the pipeline at the appropriate stage, then marches through the pipeline until it reaches the maximum for that pipe. At the end of the pipeline, the data is actually written into register files 721 (the register file core). The dual pipeline facilitates forwarding a result from a first instruction to a second instruction.

This implementation involves two write ports to register files 721, where only one was involved in the past. This is because there is no guarantee, with this design, that there will not be two writes into embedded processor 112 simultaneously.

What is not shown is the control that surrounds the write pipeline. This control includes pipelining the following information: the control for the arrival of write data; the write enable for the pipe; and the write address.

It is noteworthy with respect to control flow that, when switching control information from embedded processor 112 clock domain to ISEF 116 clock domain, control information is latched and created in embedded processor 112 clock domain. The information is staged two cycles, according to one embodiment, before it can "enter" ISEF 116 clock domain.

It is also noteworthy to examine the write enable for ISEF 116 domain. Since, in one embodiment, embedded processor 112 pipeline is substantially shorter than ISEF 116 pipeline (note that the true depth difference is not known without knowing the clock ratio, which is programmable), a write that is posted on embedded processor 112 pipeline after a write posted on ISEF 116 pipeline will likely be written into the register files 721 before the ISEF 116 pipeline write has committed. This means that ISEF 116 write data should be quashed before it enters register files 721. This mechanism is handled by special control logic, referred to as suppress logic, which checks ISEF 116 pipeline for an address match with an embedded processor 112 pipeline write (at the time of its commit). If there is a match, then the ISEF 116 pipeline write is nullified before it reaches the embedded processor 112.

Prior art solutions require that data from a PLD be integrated into a single pipeline, which is managed by a processor clock. Although there need not be any suppress logic, there are disadvantages to the prior art techniques, described herein.

In the current embodiment, functional differences from the prior art include the ability to aggregate data in an environment where the data arrives from two different, but related, clock domains.

Structural differences from the prior art include two split pipelines of different lengths and with different clocks. Suppress logic is used to account for the different lengths.

One disadvantage of prior art techniques is that the attach point for PLD data is a function of the clock ratio. The processor clock cycle for data entering the write pipeline must be calculated with the ratio in mind, in the prior art. This means that changing the ratio must be architected up front. The current system does not suffer from this drawback.

Another disadvantage of the prior art relates to the depth of the pipeline. For a ratio of three processor clock cycles to one PLD cycle, for example, three processor clock registers are required for each new piece of data in the pipeline, in the prior art.

Another advantage of the present system is speed. The read data that is sent into the datapath will come from either the output of the register file read ports, or the write pipelines themselves. It will come from the write pipeline if the data that is being requested has not been written into embedded processor 112 yet. This implies a MUX in front of each read port. The width of this MUX can be calculated to be the depth of the write pipeline plus one (for embedded processor 112 read port). Prior art designs (with a 31-stage write pipeline) would require a 32:1 MUX for this purpose. The present system, in one embodiment, implements a 13:1 MUX (nine for ISEF 116 pipeline, plus three for embedded processor 112 pipeline, plus one for embedded processor 112 read port), which should be approximately twice as fast.

Figure 8:
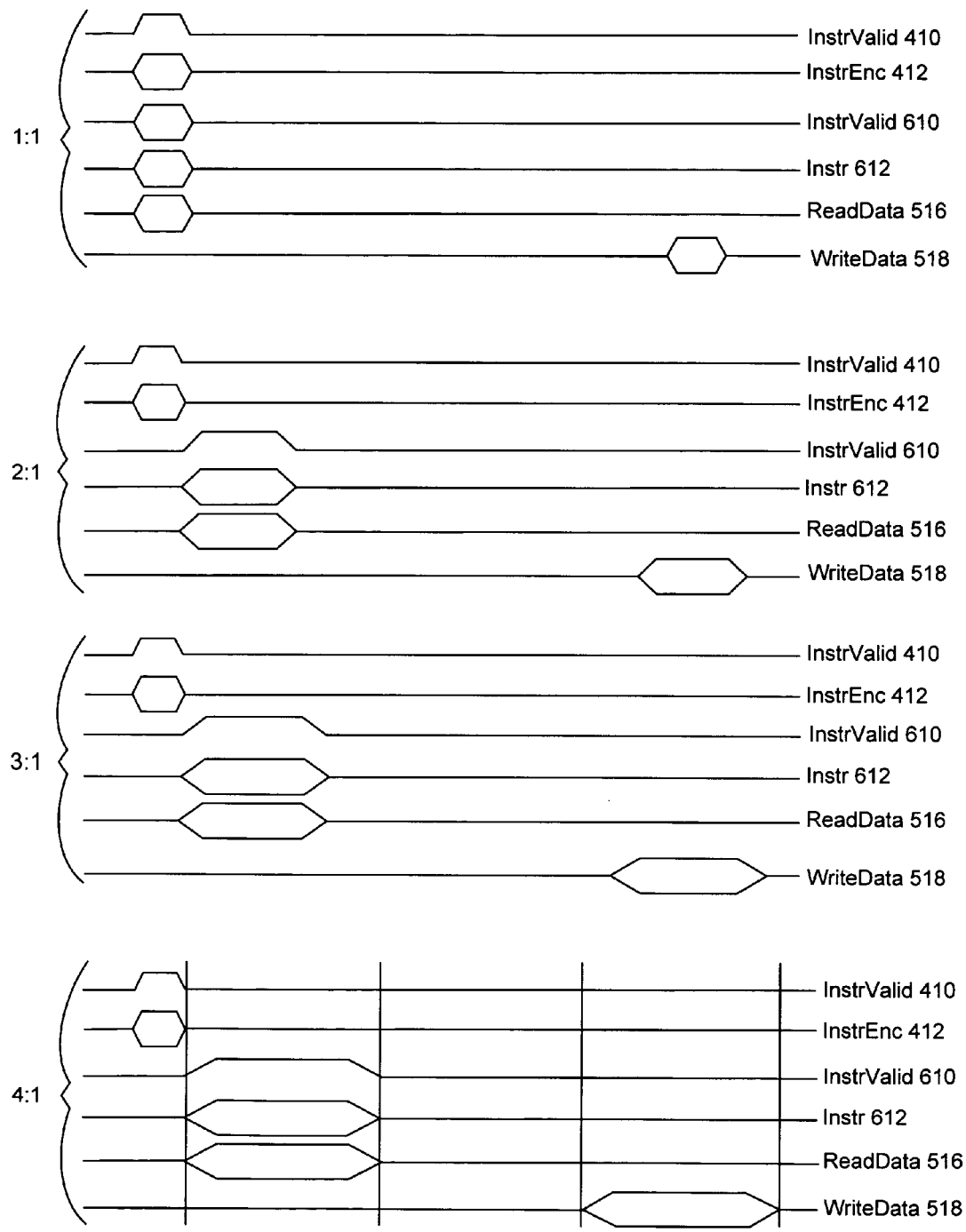
FIG. 8 is timing diagram illustrating various clock ratios, in accordance with an embodiment of the present invention.

In further keeping with some embodiments according to the present invention, FIG. 8 illustrates the effect of what we have the ability to do in the sense of a clock ratio between the speed of embedded processor 112 and the speed of ISEF 116. ISEF 116 runs on a slower clock than embedded processor 112. The clocks are synchronous but do not necessarily exhibit a one-to-one (1:1) correspondence. There is a ratio one can define post-silicon that describes the ratio between the speed of a first clock that drives embedded processor 112 and the speed of a second clock that drives ISEF 116. One function of extension adapter 114 is to take into account that ratio and to appropriately control the distribution of instructions to ISEF 116 in accordance with that ratio.

FIG. 8 gives an example of why a stall (IEStallR 744) should be generated. FIG. 8 depicts four different exemplary clock ratios: one-to-one (1:1), two-to-one (2:1), three-to-one (3:1) and four-to-one (4:1). The minimum length for which an instruction should be held is a factor of the ratio. For example, with a 3:1 clock ratio every signal sent to ISEF 116 should be held three times as long as the signal should be held in a 1:1 ratio. This has an effect on the distribution of instructions into ISEF 116 if something must be held four cycles without changing as shown in the 4:1 clock ratio timing diagrams. This means that no new instruction should be sent to ISEF 116 except for every fourth cycle. This is managed by extension adapter 114 in the form of stall logic (mentioned herein). Extension adapter 114 should realize that the instruction should line up as it were with the boundaries of when ISEF 116 clock is aligned so that the instructions prepare themselves for the beginning of a new ISEF 116 clock boundary before they get sent across into ISEF 116. This is managed through stall logic 745.

Figure 9:
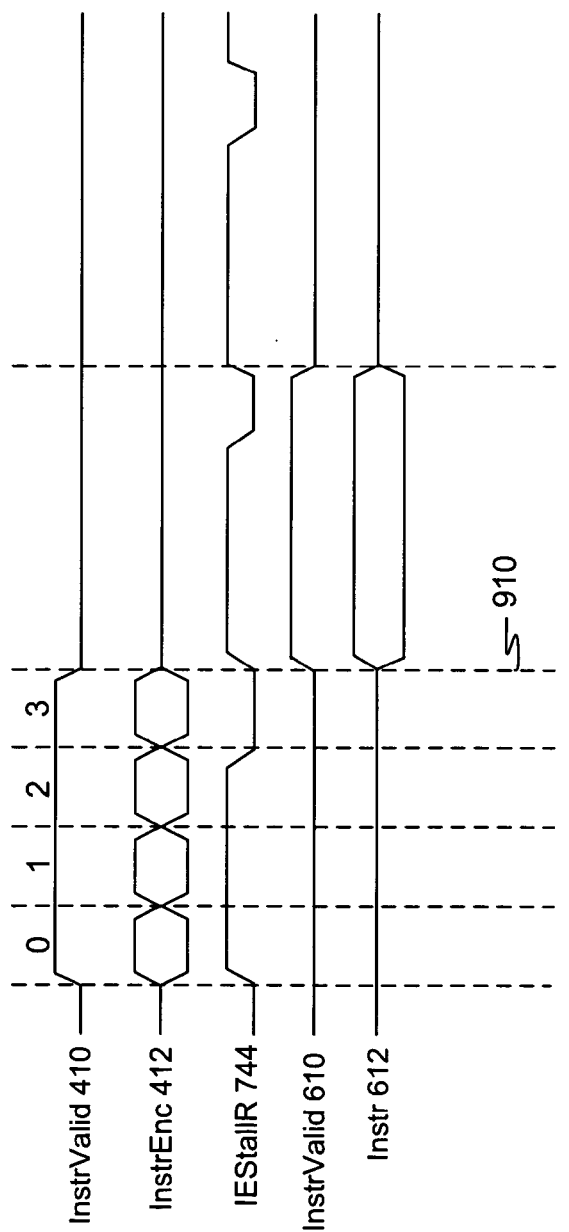
FIG. 9 is a timing diagram depicting a stall signal, in accordance with an embodiment of the present invention.

Referring to FIG. 9, signals InstrValid 410, InstrEnc 412, IEStallR 744, InstrValid 610 and Instr 612 are depicted in order to help illustrate how a stall signal is generated by extension adapter 114. Extenstion adapter 114 holds off the allocation of an instruction until the last embedded processor 112 clock cycle before the beginning of the ISEF 116 clock cycle (which is shown by vertical dashed line 910). Since the ISEF 116 clock cycle is held, in this example, for four cycles, extension adapter 114 does not allow embedded processor 112 to give ISEF 116 an instruction until the last embedded processor 112 cycle right before the beginning of vertical dashed line 910. IEStallR 744 is delayed by extension adapter 114 until the fourth (in this example) embedded processor 112 clock cycle. The numbers (0, 1, 2 and 3) refer to which number of the embedded processor 112 clock cycle is shown in relation to the beginning of the ISEF 116 clock cycle.

Figure 10:
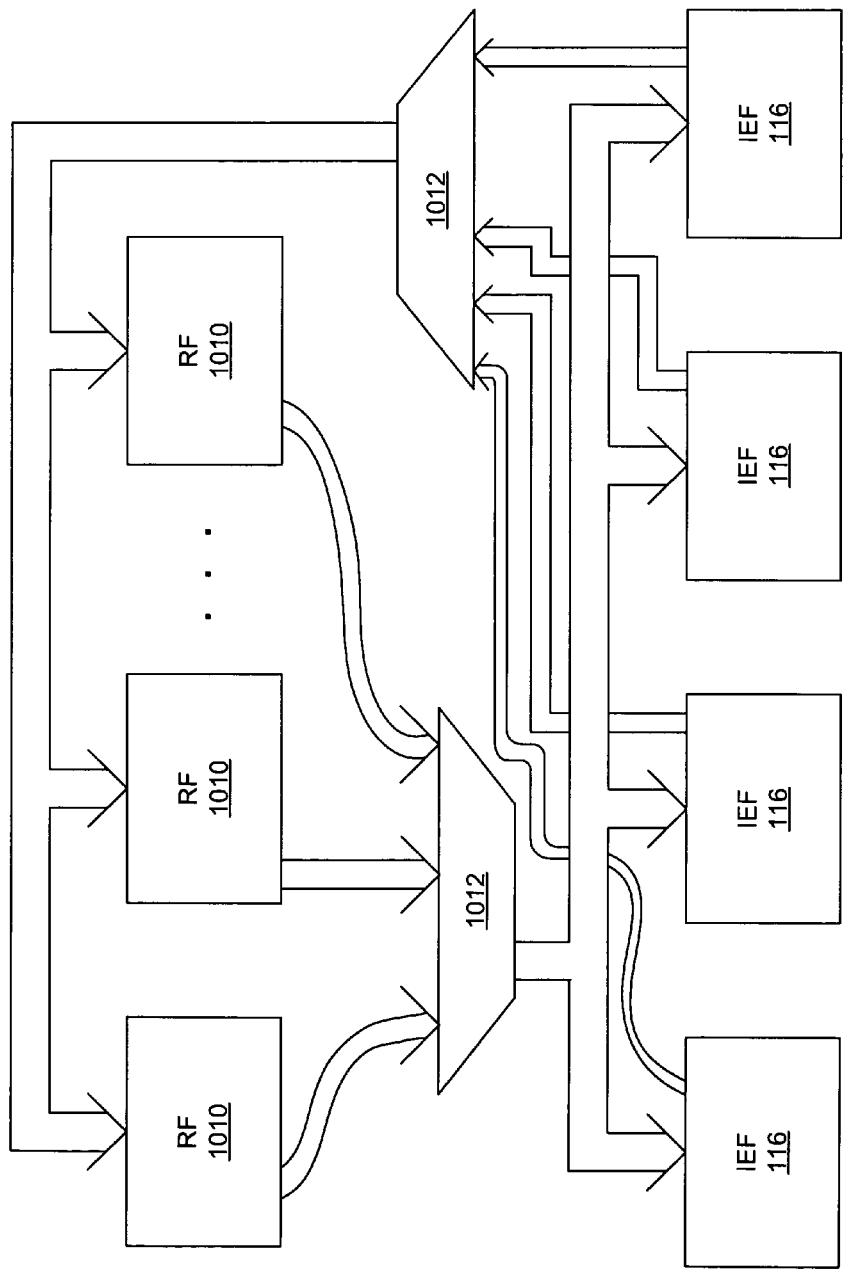
FIG. 10 is a schematic diagram a plurality of ISEFs, in accordance with an embodiment of the present invention.

Referring to FIG. 10, it is envisioned that a plurality of ISEFs 116 can be implemented, in accordance with an embodiment of the present invention. FIG. 10 depicts multiple register files (RFs) 1010 and multiple ISEFs 116 and how they interface, in one embodiment. MUX logic 1012 gathers information from register files 1010 and broadcasts this information to ISEFs 116. In one embodiment, only one ISEF 116 is active at any single beginning cycle. In other words, one ISEF 116 has a valid instruction presented at any given time. Similarly, ISEFs 116 provide write data to register files 1010 via MUX 1014. Again, one ISEF 116 operates at a given time. It is contemplated that register files 1010 are divisible. In other words, each register file 1010 can be controlled in units smaller than the bus size. In one example, the bus size may be 128 bits. Therefore, register file 1010 may, for example, comprise four separate addresses that can be gathered into a single bus.

Figure 11:
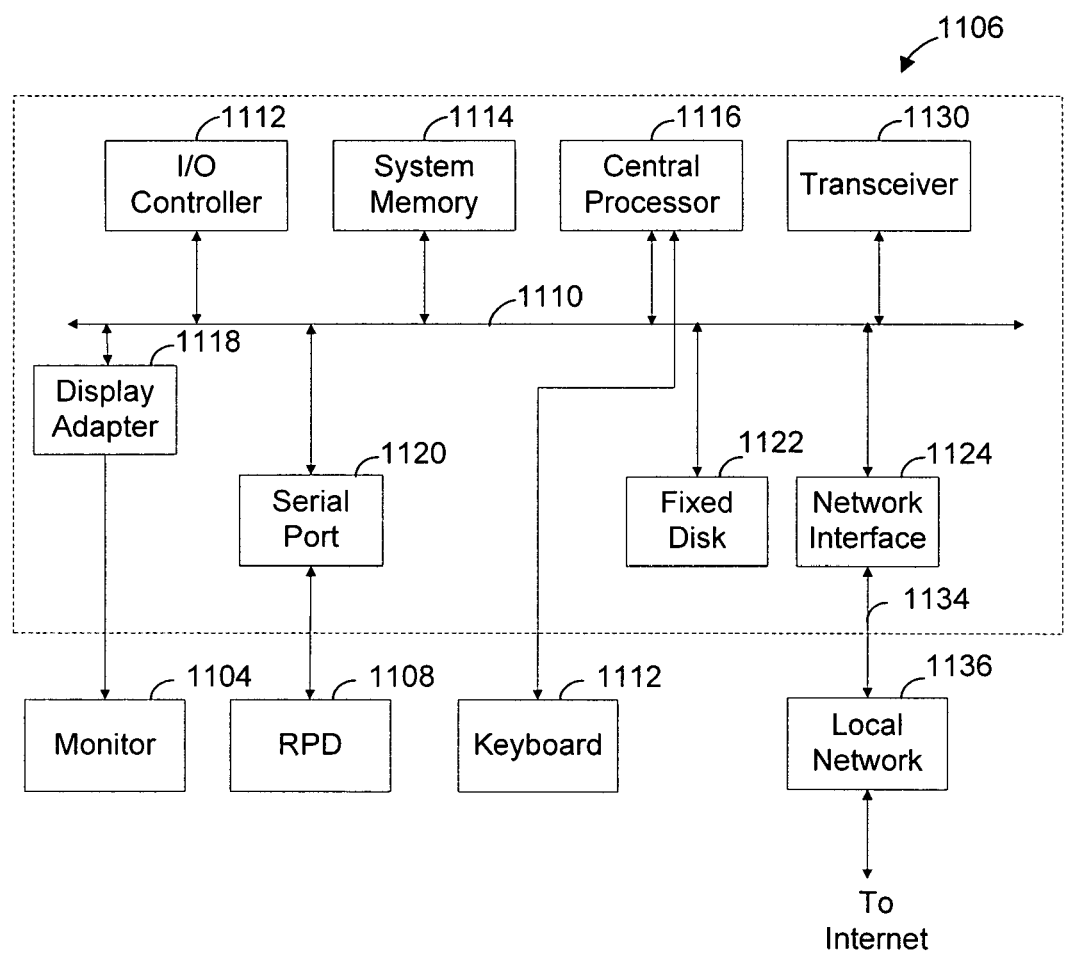
FIG. 11 illustrates subsystems of an exemplary computer system for use with the present system.

FIG. 11 illustrates subsystems found in one exemplary computer system, such as computer system 1106, that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within computer system 1106 are directly interfaced to an internal bus 1110. The subsystems include an input/output (I/O) controller 1112, a system random access memory (RAM) 1114, a central processing unit (CPU) 1116, a display adapter 1118, a serial port 1120, a fixed disk 1122 and a network interface adapter 1124. The use of bus 1110 allows each of the subsystems to transfer data among the subsystems and, most importantly, with CPU 1116. External devices can communicate with CPU 1116 or other subsystems via bus 1110 by interfacing with a subsystem on bus 1110.

FIG. 11 is merely illustrative of one suitable configuration for providing a system in accordance with the present invention. Subsystems, components or devices other than those shown in FIG. 11 can be added without deviating from the scope of the invention. A suitable computer system can also be achieved without using all of the subsystems shown in FIG. 11. Other subsystems such as a CD-ROM drive, graphics accelerator, etc., can be included in the configuration without affecting the performance of computer system 1106.

One embodiment according to the present invention is related to the use of an apparatus, such as computer system 1106, for implementing a system according to embodiments of the present invention. CPU 1116 can execute one or more sequences of one or more instructions contained in system RAM 1114. Such instructions may be read into system RAM 1114 from a computer-readable medium, such as fixed disk 1122. Execution of the sequences of instructions contained in system RAM 1114 causes the CPU 1116 to perform process steps, such as the process steps described herein. One or more processors in a multi-processing arrangement may also be employed to execute the sequences of instructions contained in the memory. In alternative embodiments, hard-wired circuitry may be used in place of or in combination with software instructions to implement the invention. Thus, embodiments of the invention are not limited to any specific combination of hardware circuitry and software.

The terms "electronically-readable medium," "electronically-readable media," "computer-readable medium" and "computer-readable media" as used herein refer to any medium or media that participate in providing instructions to CPU 1116 for execution. Such media can take many forms, including, but not limited to, non-volatile media, volatile media and transmission media. Non-volatile media include, for example, optical or magnetic disks, such as fixed disk 1122. Volatile media include dynamic memory, such as system RAM 1114. Transmission media include coaxial cables, copper wire and fiber optics, among others, including the wires that comprise one embodiment of bus 1110. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to CPU 1116 for execution. Bus 1110 carries the data to system RAM 1114, from which CPU 1116 retrieves and executes the instructions. The instructions received by system RAM 1114 can optionally be stored on fixed disk 1122 either before or after execution by CPU 1116.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A processor system, comprising:
a processor configured to execute at least one of a set of standard instructions;
a programmable logic device configured to execute at least one of a set of reconfigurable instructions; and
an extension adapter coupled to the processor and the programmable logic device, the extension adapter configured to identify an instruction as either a standard instruction or a reconfigurable instruction and to provide a signal for an identified reconfigurable instruction, the signal configured to control the type of task performed on data in the programmable logic device or the timing of execution of the identified reconfigurable instruction, the extension adapter further configured to provide a signal indicating to the processor that the identified reconfigurable instruction is one of the set of standard instructions of the processor and that the extension adapter will handle processing the instruction instead of the processor.

2. The processor system of claim 1, wherein the programmable logic device includes a diagnostic interface configured for testing the programmable logic device.

3. The processor system of claim 1, wherein the processor system comprises a plurality of separate programmable logic devices coupled to the extension adapter.

4. The processor system of claim 1, wherein the extension adapter is further configured to control the flow of a result of the identified reconfigurable instruction from the programmable logic device to the processor.

5. The processor system of claim 1, wherein the extension adapter is further configured to check the validity of the at least one of the set of reconfigurable instructions each time the at least one of the set of reconfigurable instructions is received by the extension adapter.

6. The processor system of claim 1, wherein the extension adapter is configured to stall the processor if the programmable logic device is not ready to receive the identified reconfigurable instruction.

7. The processor system of claim 1, wherein the extension adapter is configured to notify the processor if an invalid instruction is received from the processor.

8. The processor system of claim 1, wherein the control of the timing of execution of the identified reconfigurable instruction includes managing timing relationships between register reads and register writes.

9. The processor system of claim 8, wherein the timing relationships between register reads and register writes are dependent on instruction execution time of the identified reconfigurable instruction.

10. The processor system of claim 1, wherein the extension adapter is configured to suppress a pipelined write from an earlier member of the set of reconfigurable instructions if the pipelined write is superseded by a later member of the set of reconfigurable instructions.

11. The processor system of claim 1, wherein the extension adapter is configured such that the processor treats members of the set of reconfigurable instructions as if they were defined pre-silicon.

12. The processor system of claim 1, wherein the extension adapter is further configured to use a standard load instruction of the processor to move data into a register file and to use a member of the set of reconfigurable instructions to move the data from the register file to the programmable logic device under the control of the extension adapter.

13. The processor system of claim 1, wherein the extension adapter is programmable post-silicon.

14. The processor system of claim 1, wherein the extension adaptor includes a programmable configuration memory configured to store a description of the at least one of the set of reconfigurable instructions.

15. The processor system of claim 14, wherein the extension adapter is further configured to use the description of the at least one of the set of reconfigurable instructions such that the at least one of the set of reconfigurable instructions appears to the processor to be identical in form to a standard instruction of the processor.

16. The processor system of claim 14, wherein the description of the at least one of the set of reconfigurable instructions includes an address of data needed by the at least one of the set of reconfigurable instructions.

17. The processor system of claim 1, further including a configuration memory configured to store data for use by the extension adapter to provide the signal to control the type of task performed on data in the programmable logic device or the timing of execution of the identified reconfigurable instruction.

18. A processor system, comprising:
a processor configured to execute at least one of a set of standard instructions;
a programmable logic device configured to execute at least one of a set of reconfigurable instructions; and
an extension adapter coupled to the processor and the programmable logic device, the extension adapter configured to identify an instruction as either a standard instruction or a reconfigurable instruction and to provide a signal for an identified reconfigurable instruction, the signal configured to control the type of task performed on data in the programmable logic device or the timing of execution of the identified reconfigurable instruction, wherein the extension adapter comprises a first pipeline and a second pipeline, the first pipeline configured to receive data from the processor, the second pipeline configured to receive data from the programmable logic device.

19. The processor system of claim 18, wherein the second pipeline includes a plurality of insertion points and is further configured to receive the data at an insertion point selected by the extension adapter.

20. The processor system of claim 19, wherein the extension adapter is further configured to determine the selected insertion point based on decoding of an opcode included in the identified reconfigurable instruction.

21. The processor system of claim 18, wherein the first pipeline is shorter than the second pipeline.

22. The processor system of claim 21, wherein the first pipeline advances data at a first frequency and the second pipeline advances data at a second frequency.

23. The processor system of claim 22, wherein a plurality of outputs from the set of reconfigurable instructions are written to a plurality of register files within the extension adaptor.

24. The processor system of claim 18, wherein the extension adapter is configured to interface a first clock associated with the processor to the first pipeline and a second clock associated with the programmable logic device to the second pipeline.

25. A method for operating a processor system, the method comprising:
receiving at least one of a set of standard instructions and at least one of a set of reconfigurable instructions;
executing the at least one of a set of standard instructions in a processor;
identifying in an extension adapter a received instruction as either a standard instruction or a reconfigurable instruction;
providing a signal for an identified reconfigurable instruction from the extension adapter to a programmable logic device, the signal configured to control the type of task performed on data or the timing of execution of the at least one of the set of reconfigurable instructions in the programmable logic device;
executing the identified reconfigurable instructions in the programmable logic device; and
providing a signal from the extension adapter to the processor indicating to the processor that the identified reconfigurable instruction is one of the set of standard instructions of the processor and that the extension adapter will process the instruction instead of the processor.

26. The method of claim 25, further comprising recognizing and decoding in the extension adapter the set of identified reconfigurable instructions and wherein the provided signal is configured to enable data to be transferred between the processor and the programmable logic device.

27. The method of claim 25, wherein a plurality of programmable logic devices are coupled to the extension adapter.

28. A method for operating a processor system, the method comprising:
receiving at least one of a set of standard instructions and at least one of a set of reconfigurable instructions;
executing the at least one of a set of standard instructions in a processor;
identifying in an extension adapter a received instruction as either a standard instruction or a reconfigurable instruction;
providing a signal for an identified reconfigurable instruction from the extension adapter to a programmable logic device, the signal configured to control the type of task performed on data or the timing of execution of the at least one of the set of reconfigurable instructions in the programmable logic device;
executing the identified reconfigurable instructions in the programmable logic device; and
inserting data from the processor into a first pipeline and inserting data from the reconfigurable logic device into a second pipeline.

29. The method of claim 28, wherein the inserting data into the second pipeline includes selecting an insertion point from a plurality of insertion points in the second pipeline and inserting data into the selected insertion point.

30. The method of claim 28 further comprising advancing data in the first pipeline at a first frequency and advancing data in the second pipeline at a second frequency.

31. The method of claim 28, wherein the second pipeline is longer than the first pipeline.

32. The method of claim 28, further comprising interfacing a first clock associated with the processor to the first pipeline and interfacing a second clock associated with the programmable logic device to the second pipeline.

33. The method of claim 32, wherein the first clock has a frequency greater than or equal to that of the second clock.

34. The method of claim 32, wherein the first clock has a frequency that is a multiple of that of the second clock.

35. A processor system, comprising:
means for executing at least one of a set of standard instructions in a processor;
means for executing at least one of a set of reconfigurable instructions; and
means for identifying an instruction as either a standard instruction or a reconfigurable instruction and providing for an identified reconfigurable instruction a signal for controlling the type of task performed on data in the reconfigurable instruction execution means or the timing of the at least one of the set of reconfigurable instructions.

36. The processor system of claim 35, wherein the identification means comprises means for recognizing and decoding the set of reconfigurable instructions and configuring the provided signal to enable data to be transferred between the standard instruction execution means and the reconfigurable instruction execution means.

37. The processor system of claim 35, wherein the set of standard instructions are fixed pre-silicon.

38. The processor system of claim 35, wherein the set of reconfigurable instructions are reconfigurable post-silicon.

39. The processor system of claim 35, wherein the means for identifying an instruction is configured to provide a signal to the standard instruction execution means indicating that the identified reconfigurable instruction is one of the set of standard instructions and that the means for identifying the instruction will process the identified instruction instead of the standard instruction execution means.

40. The processor system of claim 35, wherein the means for identifying an instruction includes a first means for pipelining data coupled to the standard instruction execution means and a second means for pipelining data coupled to the reconfigurable instruction execution means.

41. The processor system of claim 35, further comprising a first clock associated with the first pipelining means and a second clock associated with the second pipelining means.

42. The processor system of claim 41, wherein the first clock has a frequency that is a multiple of that of the second clock.

43. An extension adapter configured to be coupled to a processor configured to execute at least one of a set of standard instructions and to a programmable logic device configured to execute at least one of a set of reconfigurable instructions, the extension adapter further configured to identify an instruction as either a standard instruction or a reconfigurable instruction and to provide a signal for an identified reconfigurable instruction, the signal configured to control the type of task performed on data in the programmable logic device or timing of execution of the identified reconfigurable instruction, wherein the extension adapter includes a first pipeline and a second pipeline, the first pipeline configured to receive data from the processor, the second pipeline configured to receive data from the programmable logic device.

44. The extension adapter of claim 43, wherein the set of standard instructions are fixed pre-silicon.

45. The extension adapter of claim 43, wherein the set of reconfigurable instructions are reconfigurable post-silicon.

46. The extension adapter of claim 43, wherein the set of reconfigurable instructions appear to the processor to function as fixed pre-silicon instructions.

47. The extension adapter of claim 43, wherein the extension adapter comprises an interface configured to receive a first clock signal for advancing data through the first pipeline and associated with the processor and to receive a second clock signal for advancing data through the second pipeline and associated with the programmable logic device.

48. The extension adapter of claim 47, wherein the first clock has a frequency greater than or equal to that of the second clock.

49. The extension adapter of claim 47, wherein the first clock has a frequency that is a multiple of that of the second clock.

* * * * *

UNITED STATES PATENT AND TRADEMARK OFFICE
CERTIFICATE OF CORRECTION

PATENT NO.         : 7,590,829 B2                                                              Page 1 of 1
APPLICATION NO.    : 10/404706
DATED              : September 15, 2009
INVENTOR(S)        : Scott D. Johnson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this

Twenty-first Day of September, 2010

David J. Kappos
*Director of the United States Patent and Trademark Office*